United States Patent [19]

Dorsch

[11] 4,056,279
[45] Nov. 1, 1977

[54] AIR DEFLECTOR FOR TRACTOR-TRAILER VEHICLE

[75] Inventor: Robert Eugene Dorsch, South Bend, Ind.

[73] Assignee: Uniroyal, Inc., New York, N.Y.

[21] Appl. No.: 634,553

[22] Filed: Nov. 24, 1975

[51] Int. Cl.² .................................................. B62D 35/00
[52] U.S. Cl. ..................................... 296/1 S; 105/2 R
[58] Field of Search ................ 296/1 S, 91; 105/2 R, 105/2 A; 180/1 FV

[56] References Cited

U.S. PATENT DOCUMENTS

| 3,822,910 | 7/1974 | Wiley | 296/1 S |
|---|---|---|---|
| 3,866,967 | 2/1975 | Landry | 296/1 S |

OTHER PUBLICATIONS

"Bates Plexiglas Fairing Shields", from 1967-1968 edition of Bates Motorcycle Catalog, p. 34.
"Thru-Lighted Billboard", by Airshield received in Group on July 23, 1975.
"Uniroyal Introduces Air Deflector", pp. 113-115 of the Mar. 1975 edition of Fleet Owner.

*Primary Examiner*—Joseph F. Peters, Jr.
*Assistant Examiner*—John A. Carroll
*Attorney, Agent, or Firm*—Norbert P. Holler

[57] ABSTRACT

An air deflector, which is adapted to be mounted on the roof of a cab of a tractor pulling a trailer and has a frontwardly facing totally curved air deflecting surface that is symmetrical about a vertical center plane and is forwardly convex in all horizontal and vertical cross-sectional planes, is disclosed. To define the deflecting surface, the deflector has a central portion and a pair of symmetrical rearwardly turned wing portions at the opposite sides of the central portion and includes a top edge of substantially circular curvature and a base edge of substantially elliptical curvature. The deflector is installed for angular adjustment about a horizontal axis to a number of different positions correlated with both the height difference between the tractor cab and trailer roofs and the distance between the rear of the cab and the front of the trailer, and so that the base edge of the deflector is located at a predetermined height above a given horizontal plane disposed below the plane of the cab roof and so that in all adjusted positions of the deflector the vertex of the included angle between the radii of curvature of the top and base edges of the deflector at the vertical center plane is located below the plane of the cab roof and on the said horizontal plane. This abstract is not to be taken either as a complete exposition or as a limitation of the present invention, however, the full nature and extent of the invention being discernible only by reference to and from the entire disclosure.

15 Claims, 7 Drawing Figures

TABLE

| | Spacing from Plane | | Spacing from Plane | | Spacing from Plane | | Spacing from Plane | | Spacing from Plane |
|---|---|---|---|---|---|---|---|---|---|
| 1 | 12.170 | 21 | 8.680 | 41 | 9.375 | 61 | 7.915 | 81 | 2.720 |
| 2 | 11.630 | 22 | 8.335 | 42 | 7.995 | 62 | 7.020 | 82 | 2.100 |
| 3 | 10.660 | 23 | 8.950 | 43 | 7.535 | 63 | 5.730 | 83 | 4.000 |
| 4 | 9.395 | 24 | 10.140 | 44 | 6.520 | 64 | 4.605 | 84 | 3.830 |
| 5 | 8.865 | 25 | 11.055 | 45 | 7.480 | 65 | 5.025 | 85 | 3.645 |
| 6 | 12.050 | 26 | 11.575 | 46 | 8.645 | 66 | 6.005 | 86 | 3.205 |
| 7 | 11.525 | 27 | 11.800 | 47 | 9.515 | 67 | 6.635 | 87 | 2.530 |
| 8 | 10.630 | 28 | 11.625 | 48 | 9.985 | 68 | 6.905 | 88 | 1.460 |
| 9 | 9.455 | 29 | 11.060 | 49 | 10.130 | 69 | 6.825 | 89 | 0.300 |
| 10 | 8.905 | 30 | 10.070 | 50 | 9.910 | 70 | 6.440 | | |
| 11 | 8.780 | 31 | 8.695 | 51 | 9.340 | 71 | 5.750 | | |
| 12 | 9.355 | 32 | 8.160 | 52 | 8.385 | 72 | 4.740 | | |
| 13 | 10.570 | 33 | 7.560 | 53 | 7.090 | 73 | 3.805 | | |
| 14 | 11.440 | 34 | 8.280 | 54 | 5.233 | 74 | 4.490 | | |
| 15 | 11.980 | 35 | 9.485 | 55 | 6.305 | 75 | 4.965 | | |
| 16 | 12.205 | 36 | 10.410 | 56 | 7.450 | 76 | 5.350 | | |
| 17 | 12.050 | 37 | 10.915 | 57 | 8.215 | 77 | 5.390 | | |
| 18 | 11.505 | 38 | 11.090 | 58 | 8.630 | 78 | 5.215 | | |
| 19 | 10.540 | 39 | 10.910 | 59 | 8.775 | 79 | 4.750 | | |
| 20 | 9.225 | 40 | 10.355 | 60 | 8.490 | 80 | 3.800 | | |

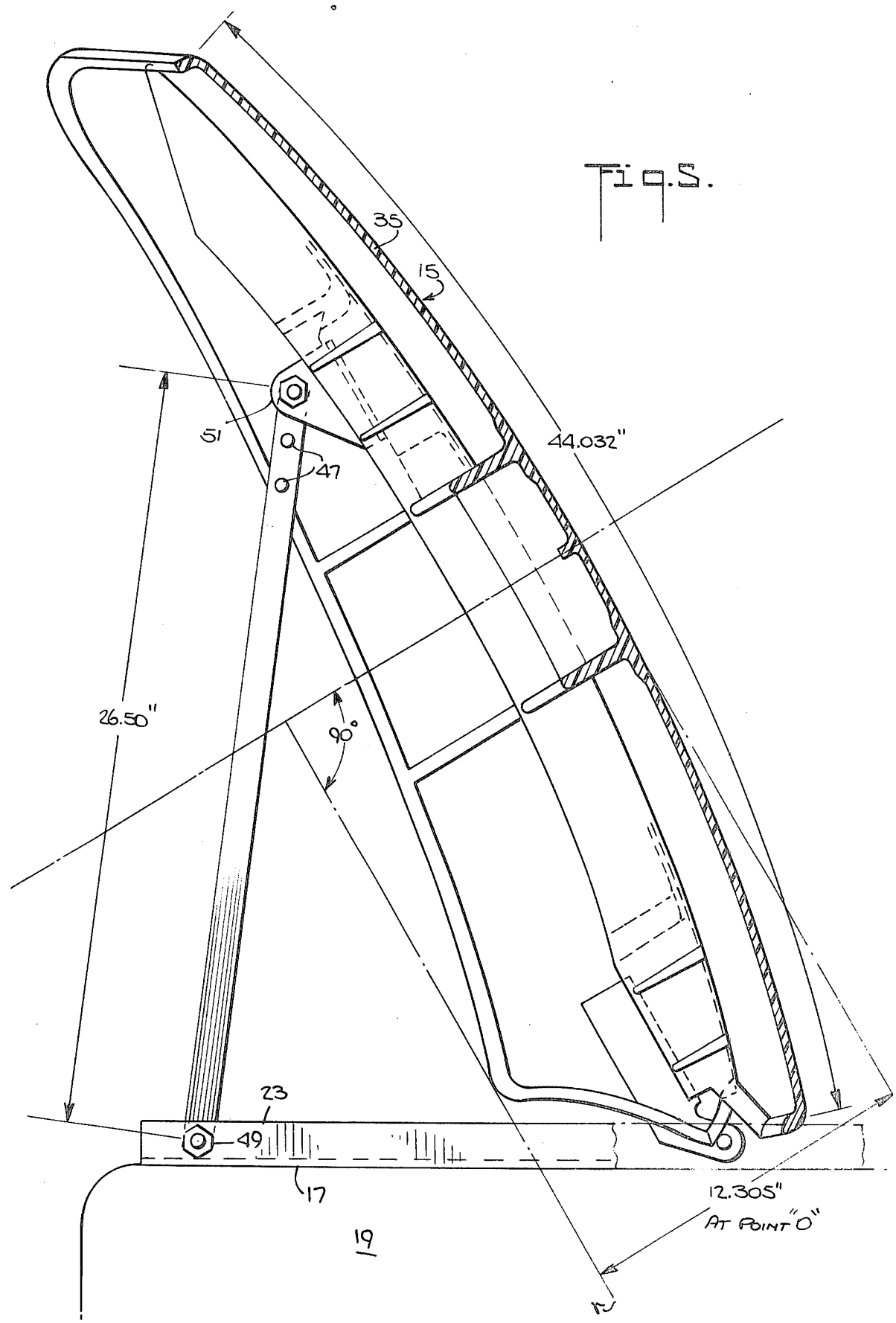

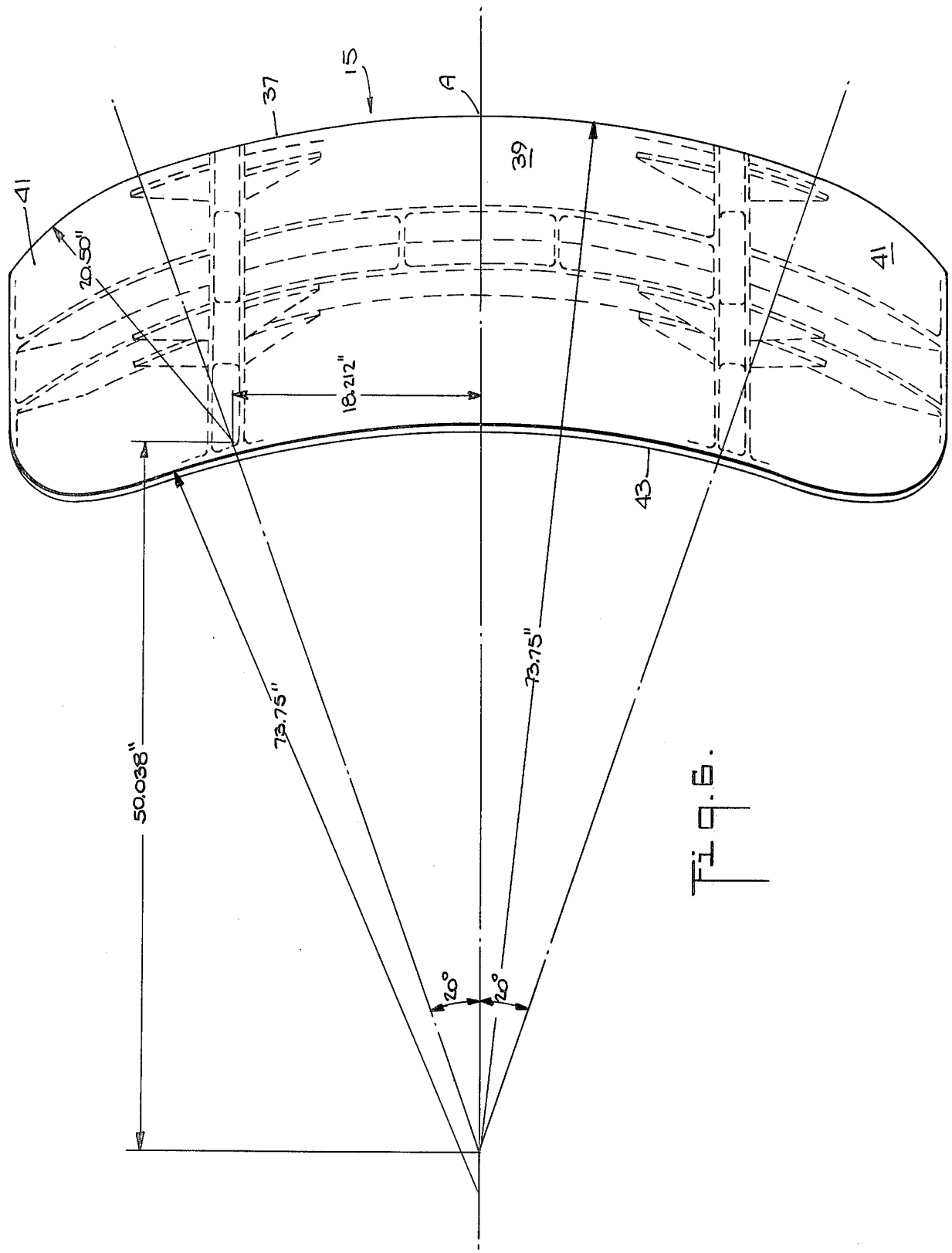

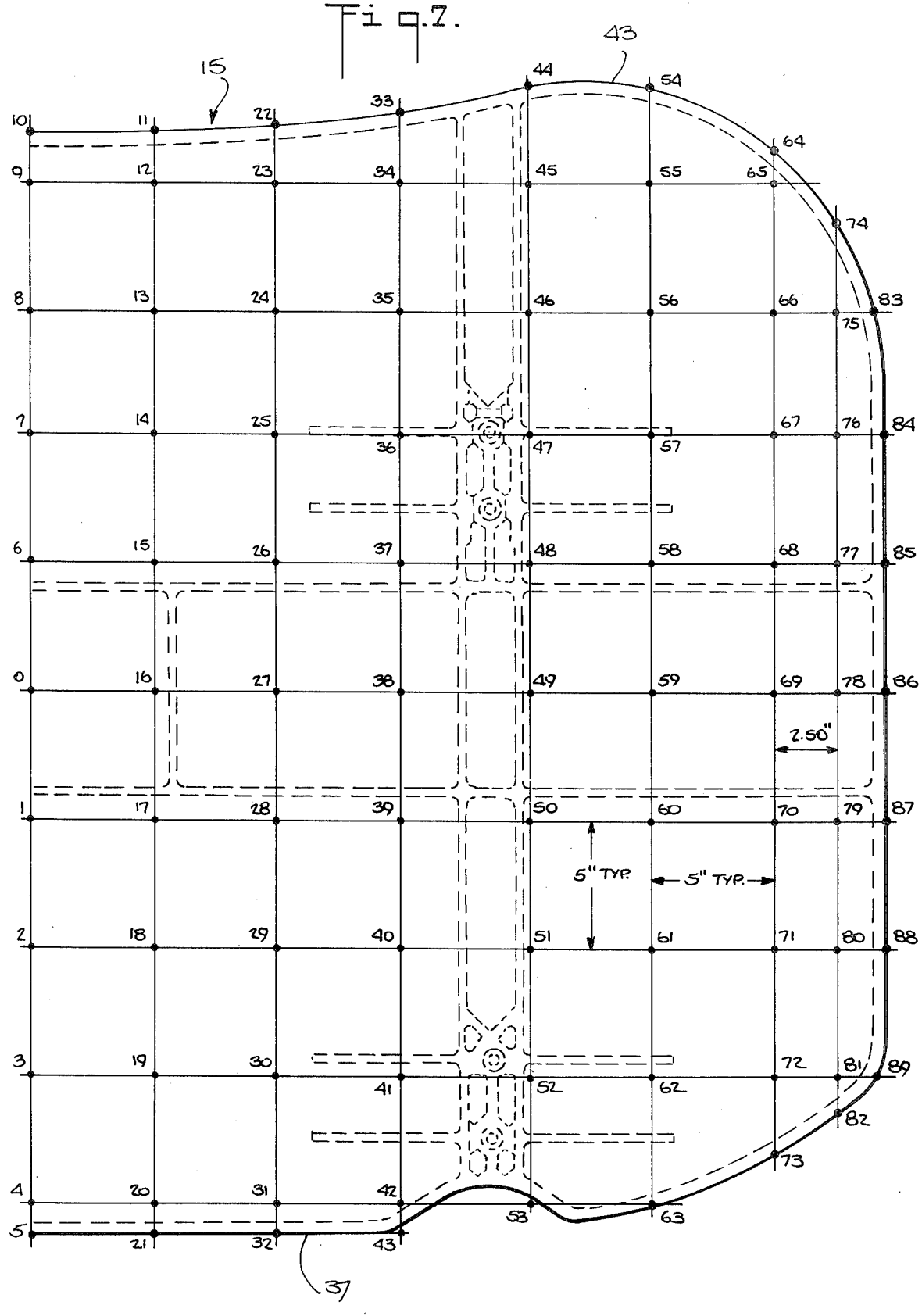

AIR DEFLECTOR FOR TRACTOR-TRAILER VEHICLE

BACKGROUND OF THE INVENTION

The instant invention relates to a device for reducing the air resistance to the forward movement of a tractor-trailer combination vehicle. More particularly, the invention relates to an air deflector suitable for mounting on the roof of a tractor cab towing a trailer to reduce air resistance to forward movement (drag) of the tractor-trailer combination through a reduction in the separation of the air flow that characterizes prior art devices of this type.

Since the arrival of the fuel shortage era, there have been many endeavors to maximize the number of miles obtained from each gallon of fuel. Tractor-trailer combination vehicles consume large amounts of fuel and consequently there have been considerable efforts to increase the fuel efficiency of these vehicles. Most of these efforts have comprised the placement of some type of air flow deflecting baffle on the cab roof of the tractor in order to streamline the vehicle and thereby reduce drag arising from the separation of air at the forward portion of the tractor-trailer combination vehicle. A different approach was taken in U.S. Pat. No. 3,241,876 wherein it is stated that an air shield was used to deflect the onrushing air in such a manner as to occasion a very large separation of the air flow. The U.S. Pat. No. 3,241,876 asserts that the separation causes a low pressure bubble to be formed in the gap between the tractor and trailer and that there is a drag reduction due to the lowered resistance encountered by the forward portion of the trailer. There is now an air shield device similar to that disclosed in the U.S. Pat. No. 3,241,876 patent being marketed by the Rudkin-Wiley Corporation which has an exclusive license under the U.S. Pat. No. 3,241,876 patent.

A NASA publication entitled "Aerodynamic Drag Reduction Test on Full-Scale Tractor-Trailer Combination With Several Add-On Devices" (NASA TMX-56028) by Lawrence C. Montoya and Louis L. Steers of the NASA Flight Research Center, December, 1974, summarizes a cooperative study between the NASA Flight Research Center at Edwards, California and the DOT Transportation Systems Center at Cambridge, Massachusetts. A tractor-trailer combination vehicle was tested for aerodynamic drag reduction without any add-on devices and with five add-on devices, one being the Rudkin-Wiley air shield. The vehicle was run at 55 miles per hour with zero wind conditions. The Rudkin-Wiley air shield was shown to achieve significantly more drag reduction than any of the other devices. Specifically, at the test spacings of 62 and 40 inches between the rear of the tractor and the front of the trailer, the Rudkin-Wiley device achieved 24% and 16% reductions, respectively, in aerodynamic drag, whereas the other devices achieved reductions only between 2 and 19% for the two different spacings. It should be noted that one of the devices tested was a device currently being marketed by Air-Flo Co.

Although the Rudkin-Wiley air shield represents an improvement in drag reduction over no air deflecting device at all, the instant invention provides an air deflector which has been mathematically designed to maximize the drag reduction and thereby maximize fuel savings. More particularly, the instant invention provides an air deflector which reduces fuel consumption by such a significant amount as to make obsolete all of the prior art devices.

SUMMARY OF THE INVENTION

The instant invention provides an air deflector which is suitable for mounting on the roof of a cab of a tractor pulling a trailer. The deflector reduces separation of air during its passage over the tractor-trailer combination and prevents air from stagnating on the outer, forward, deflecting surface of the deflector. The deflector comprises a frontwardly facing central portion and a pair of symmetrical wing portions on opposite sides of the central portion, and provides a totally curved deflecting surface symmetrical about a vertical center plane. The term "totally curved" is intended to denote that in its frontwardly directed face the; surface of the deflector is forwardly convex in all its horizontal and vertical cross sectional planes.

The deflector has a top edge of substantially circular curvature and a base edge of elliptical curvature substantially conforming to the equation $$y = \sqrt{1296\left(1 - \frac{x^2}{5184}\right)}$$

inches wherein $x$ varies between about 34 and 69 inches, when viewed perpendicular to a horizontal plane. The deflector is installed for angular adjustment about a horizontal axis to a number of different positions correlated with both the height difference between the tractor cab and trailer roofs and the distance between the rear of the cab and the front of the trailer, and so that the base edge of the deflector is located at a predetermined height above a given horizontal plane disposed below the plane of the cab roof, and further so that in all adjusted positions of the deflector the vertex of the angle included between the radii of curvature of the top and base edges of the deflector at the vertical center plane thereof, i.e. the center of curvature of the centeral portion of the air deflecting surface, is located below the plane of the cab roof and on the said horizontal plane. In the preferred form of the invention, the height of the base edge; above the said horizontal plane is substantially equal to the product of the radius of curvature of the base edge (and thus of the central portion of the air-deflecting surface) of the deflector, i.e.; an hypotenuse of about 74 inches, and the sine of an included angle of about 12° to 16° with the horizontal plane. The center of the base curve is defined as point A. There is a radius of about 74 inches in a horizontal plane which substantially meets the elliptical base curve in the central portion thereof over an arc distance of about 20° on either side of the center A of the elliptical base curve. There are two radii, each of about 20 inches, in a horizontal plane which substantially meet the elliptical base curve in the wing portions thereof on either side of the central portion. Both the 74 and 20 inch radii are true radii when both are viewed perpendicular to a horizontal plane. The deflecting surface is defined by (a) generating the central portion of the base curve upwardly through an angle of about 34° to define the top curve, said top curve being an arc having a true radius of about 74 inches when viewed perpendicular to a horizontal plane, and wherein the generated central surface portion has a true 74 inch radius when viewed perpendicular to a horizontal plane at every position of point A as point A generates the vertical curvature and (b) a gradual merging of the wing portions of the base curve with the top curve, whereby the 20 inch radii are merged into the 74 inch radius at the top edge region of the wing portions.

BRIEF DESCRIPTION OF THE DRAWINGS

FIG. 5 is an enlarged, central, vertical sectional view of the FIG. 1 air deflector with some preferred dimensions being indicated.

FIG. 6 is an enlarged, top plan view of the FIG. 1 air deflector with some preferred angles and dimensions being indicated.

FIG. 7 is an enlarged, orthographic projection of one half of the FIG. 1 air deflector with numbers 0–89 being assigned to a multiplicity of point locations in a plane.

DESCRIPTION OF THE PREFERRED EMBODIMENTS

Figure 1:
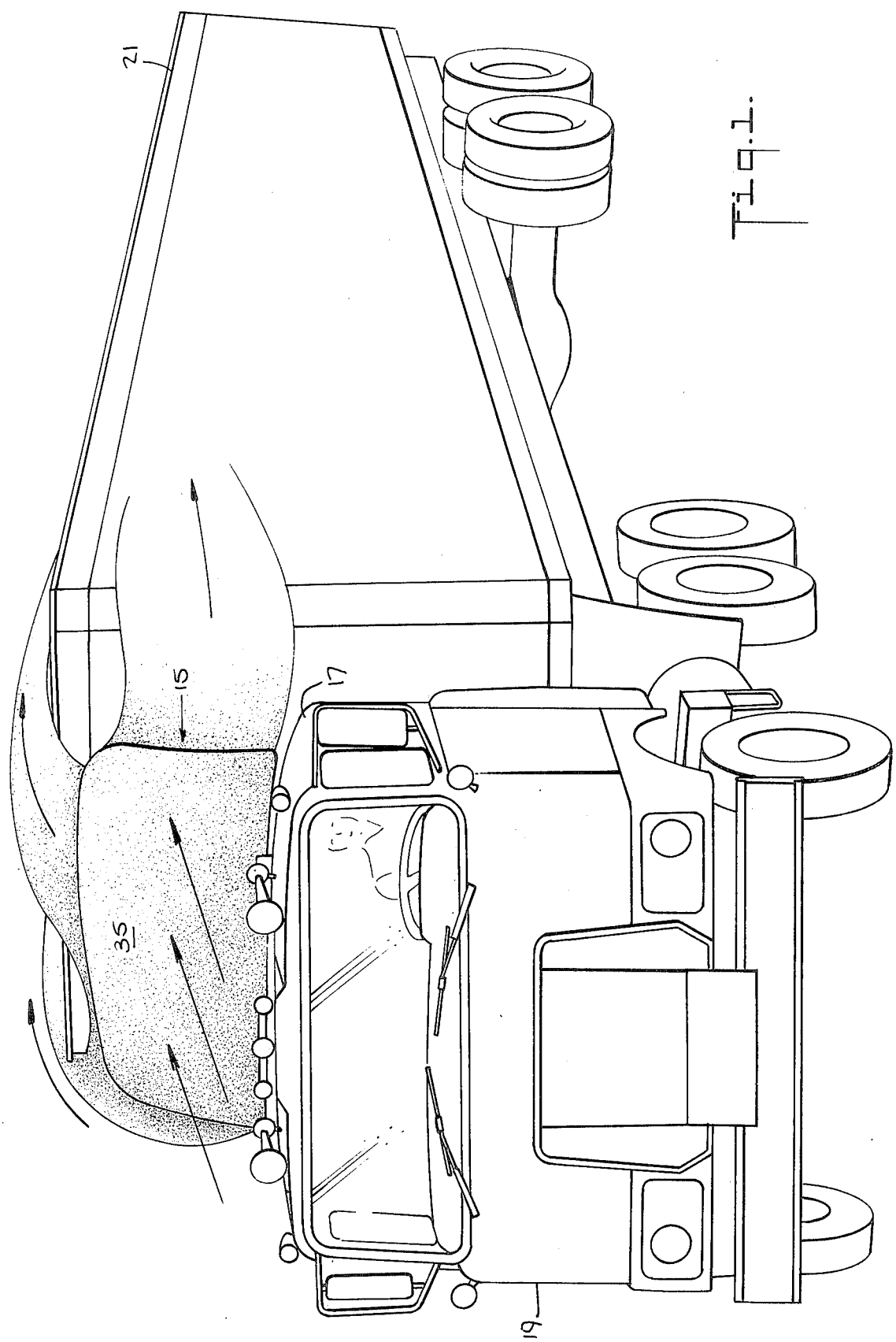
FIG. 1 is a perspective view of the air deflector of the instant invention mounted on the cab roof of a tractor pulling a trailer.
Figure 2:
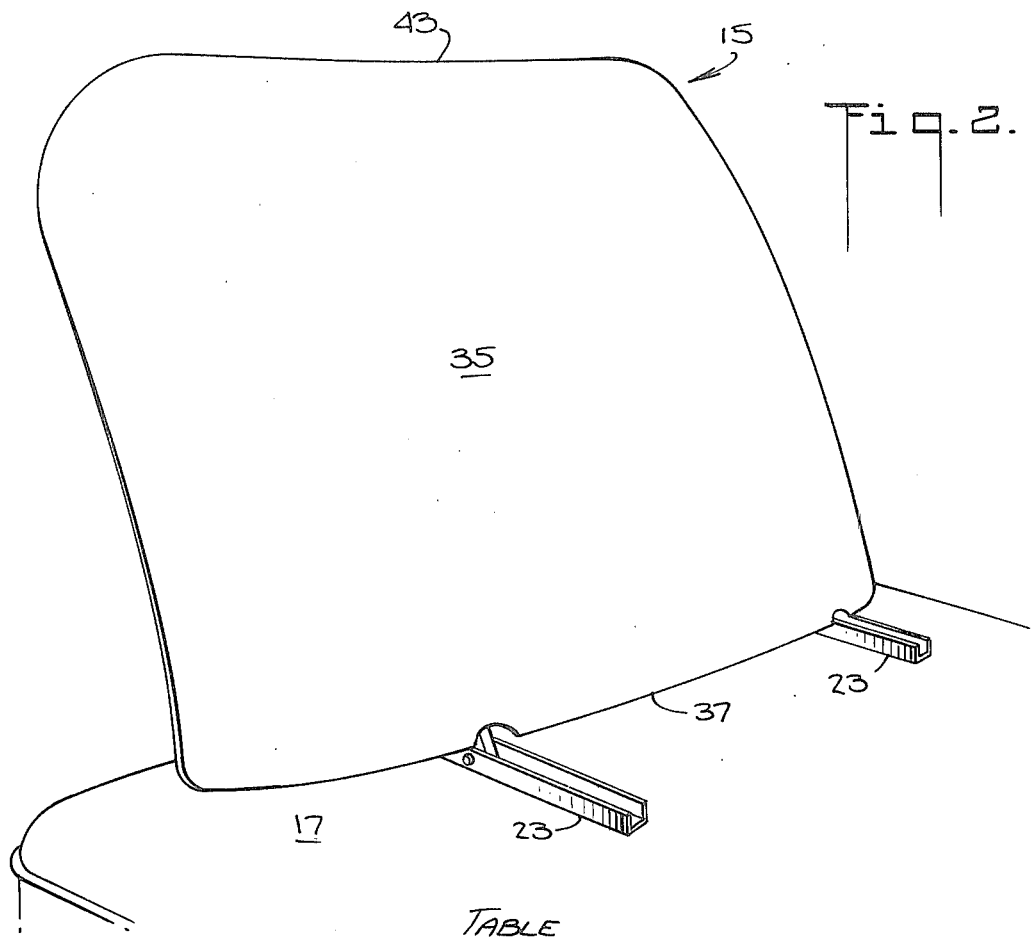
FIG. 2 is an enlarged, perspective view of the FIG. 1 air deflector mounted on the cab roof.
Figure 3:
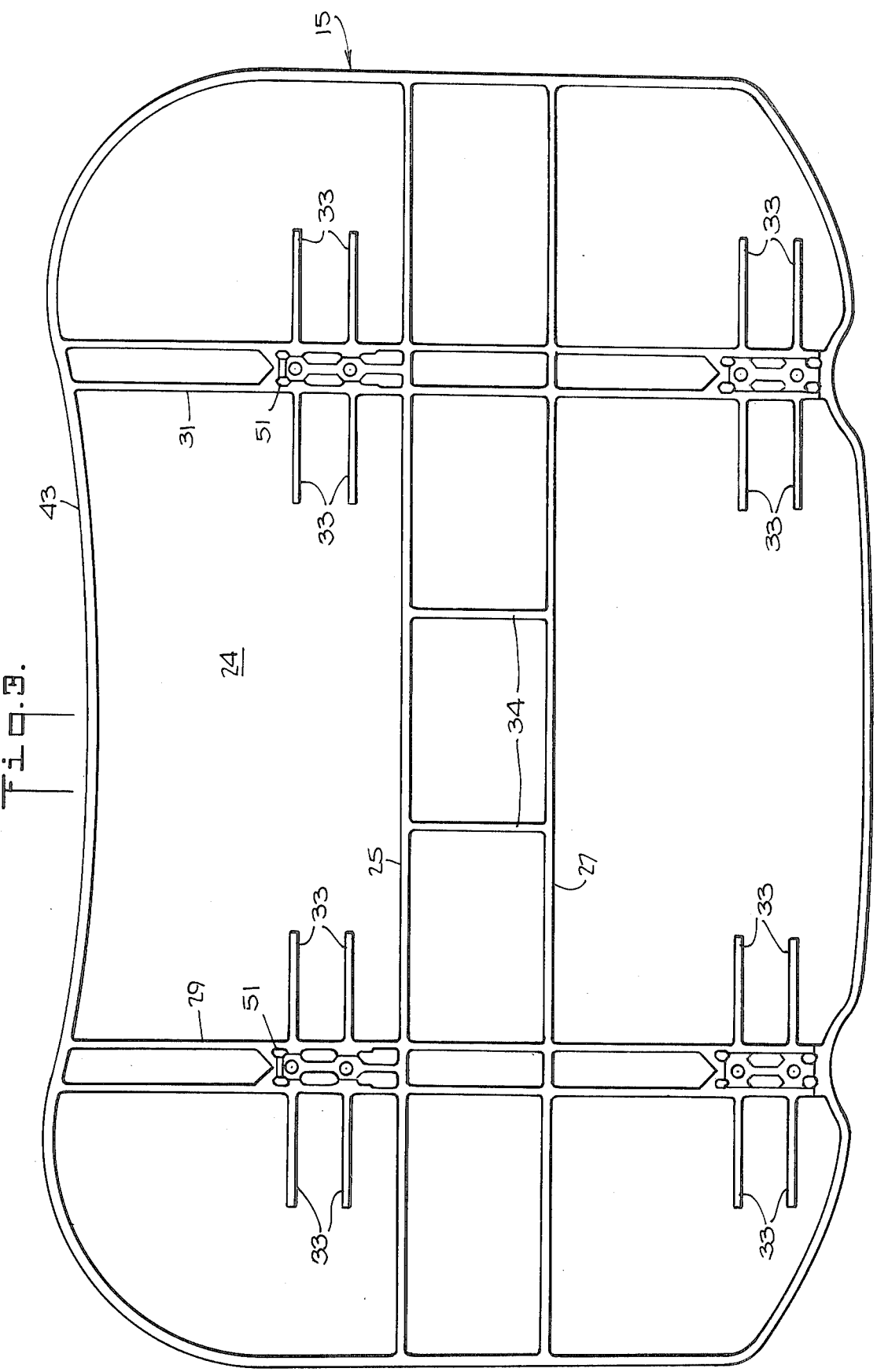
FIG. 3 is an enlarged, elevational view of the rear of the FIG. 1 air deflector.

In describing the preferred embodiment, reference is made to the drawings, wherein FIG. 1 depicts an air deflector generally designated 15 mounted above the cab roof 17 of a tractor 19 which is pulling a trailer 21. As seen in FIG. 1, the air flow moves across the gap between the tractor 19 and the trailer 21 in such a manner that the separation of air is minimized during its passage over the tractor-trailer combination vehicle. It should also be noted air is prevented from stagnating on the outer forward deflecting surface 35 of the deflector 15. FIG. 2 depicts the air deflector 15 secured to the cab roof 17 by means of a pair of U-shaped channel members 23, and illustrates that the air deflector 15 is curved in all its horizontal planes as well as in all its vertical planes. FIG. 3 depicts the reinforcement structure on the rearward surface 24 of the air deflector 15, which comprises a pair of parallel, horizontal ribs 25 and 27 extending the full width of the air deflector 15. The reinforcement structure also includes a pair of parallel, vertical ribs 29 and 31 extending the full height of the deflector 15. Each of the four quadrants of the deflector 15 includes four shortened, horizontal ribs 33 which extend transversely of the vertical ribs 29 and 31. A pair of shortened, parallel vertical ribs 34 connect the horizontal ribs 25 and 27 on either side of the central vertical plane bisecting the deflector 15.

Figure 4:
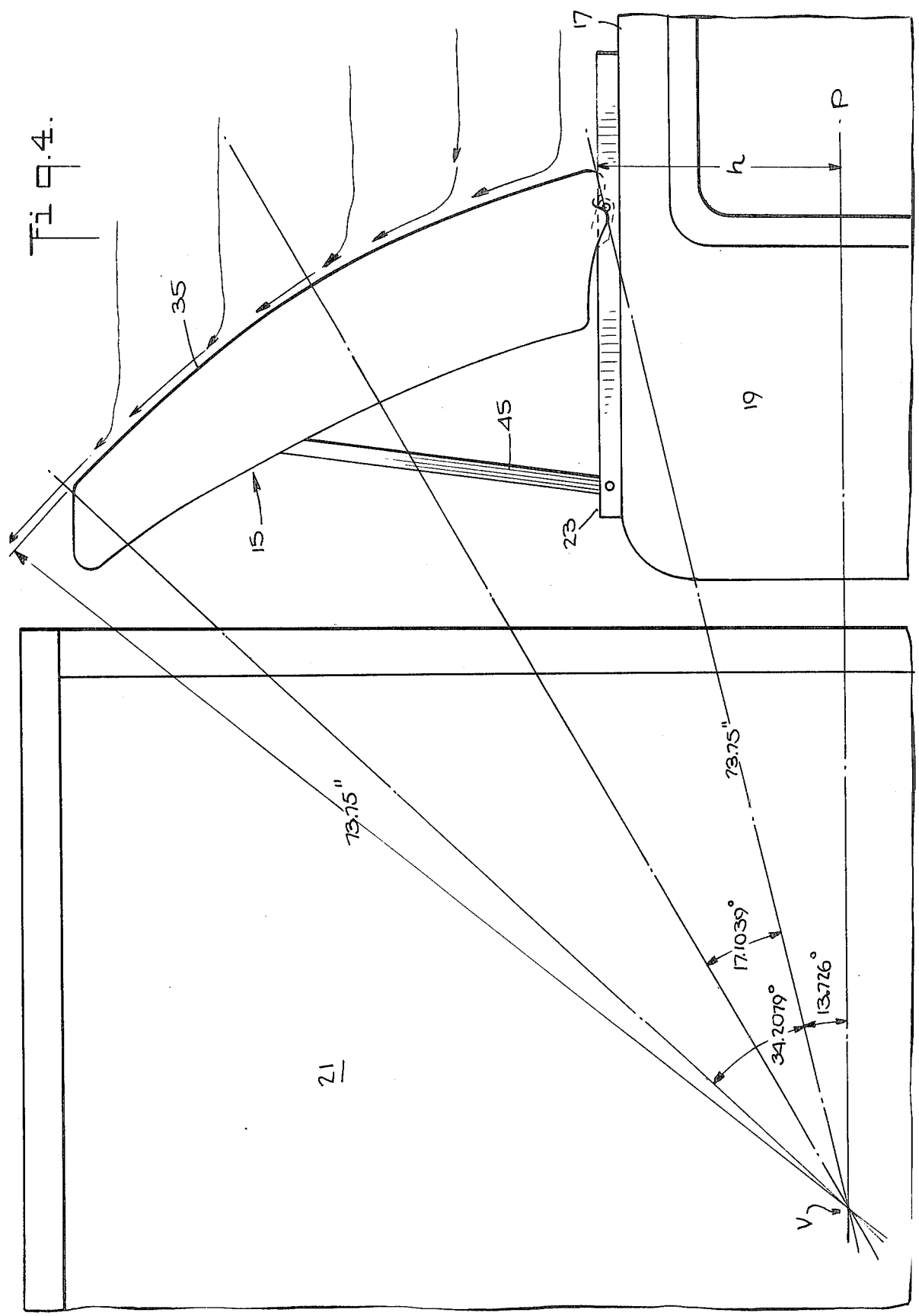
FIG. 4 is an enlarged, elevational view of one side of the FIG. 1 air deflector with preferred angles and a preferred radius being indicated.

As seen in FIGS. 1, 2, and 4–6, the air deflector 15 includes a totally curved deflecting surface 35 which is symmetrical about a central vertical plane. It can be seen that the deflecting surface 35 is forwardly convex in all its horizontal planes and forwardly convex in all its vertical planes. The deflecting surface 35 inclues a base edge curve 37 (FIGS. 2, 6 and 7) which has elliptical curvature substantially conforming to the equation $$y = \sqrt{1296\left(1 - \frac{x^2}{5184}\right)}$$

inches, wherein $x$ varies between about 34 and 69 inches, when the base edge curve is viewed perpendicular to a horizontal plane. The base edge curve is at a height $h$ above a horizontal plane $p$ (see FIG. 4) which is situated below the plane of the cab roof 17. The height $h$ in the illustrated embodiment is substantially equal to the product of an hypotenuse of 73.75 inches i.e. the radius of curvature of the base edge 37, and the sine of the included angle of 13.726° between that radius and the horizontal plane $p$. It will be seen that the vertex V of the included angle between the said radius and plane is also the point of intersection between the radius of curvature of the top edge of the deflector and that plane and at the same time is the center of curvature for generating the vertical curvature of the deflecting surface 35. The center of the base curve 37 is defined as point A (see FIG. 6). The vertex V for all operative positions of inclination of the deflector is located below the plane of the cab roof 17, as seen in FIG. 4, whereby the deflecting surface 35 presents no vertical face to the moving air so that there is no buildup of air pressure against the deflector 15. Such an arrangement also prevents points of air stagnation.

Referring now to FIG. 6, the deflector 15 may be considered as comprising a central portion 39 and a pair of symmetrical wing portions 41 situated on either side of the central portion 39. There is a radius of 73.75 inches in a horizontal plane which substantially meets the elliptical base curve 37 in the central portion 39 thereof over an arc distance of about 20° on either side of the center A of the above curve. There are two radii, each of 20.50 inches, in a horizontal plane which substantially meet the elliptical base curve 37 in the wing portions 41 on either side of the central portion 39. Both the 73.75 and 20.50 inch radii are true radii when both are viewed perpendicular to a horizontal plane.

The deflecting surface 35 is defined by (a) generating the central portion 39 of the base curve 37 upwardly through an angle of 34.2079° (see FIG. 4) to define a top curve 43 which is an arc having a true radius of 73.75 inches when viewed perpendicular to a horizontal plane. The generated central surface portion 39 has a true 73.75 inch radius (see FIG. 6) when viewed perpendicular to a horizontal plane at every position of point A as point A generates the vertical curvature. The deflecting surface is further defined by a gradual merging of the wing portions 41 of the base curve 37 with the top curve 43, whereby the 20.50 inch radii are merged into the 73.75 inch radius in the wing portion 41.

In order that the curvature of the deflecting surface 35 may be better understood, FIG. 7 provides an orthographic projection of one-half of the deflecting surface 35. The great majority of the points are located in the corners of squares having 5 inches per side. Point 0 in FIG. 7 represents substantially the mid point of the deflecting surface 35 and, as indicated in FIG. 5, is spaced from a reference plane $r$ 12.305 inches. The spacings from plane $r$ for the remaining 89 points are indicated in the "Table" under FIG. 2.

Referring now to FIGS. 4 and 5, a supporting rod 45 with apertures 47 for adjusting the height of the deflector 15 is secured by connecting pins 49 to the U-shaped channel members 23 and to the reinforcement ribs 29 and 31 by way of flanges 51. The deflector 15 is shown extended to its maximum height of 40 inches, but it may be lowered to other heights by using the remaining apertures 47 to join the rod 45 to the deflector 15. If these adjustments are made, then obviously the angular relationships depicted in FIG. 4 will vary, but the key point is that the vertex V always remains in a horizontal plane $p$ below the plane of the cab roof 17. For example, the included angle may vary between about 12 and 16 degrees. The general rule is that the height of the deflector should be increased as the ratio of (trailer height minus cab height) to (spacing between tractor and trailer) increases.

Several tests were conducted comparing a tractor-trailer vehicle using the subject invention air deflector, the Rudkin-Wiley air shield (representing the best of the prior art according to NASA testing) and no air deflector. The gap between the tractor and trailer measure 34½ inches, and the distance from the top of the cab roof to the top of the trailer roof measured 48 inches. The tractor-trailer combination had a gross weight of 65,000 lbs., and the tests were conducted at a vehicle speed of 56 miler per hour (typical line haul speed) into a prevailing wind of a speed indicated below. The table below summarizes the results, and shows the significantly increased improvements of the inventive deflector over the Rudkin-Wiley shield in terms of no device:

|  | No Device | Rudkin-Wiley Shield | Inventive Deflector |
|---|---|---|---|
| Wind velocity (m.p.h.) | 15–20 | 11–20 | 7–15 |
| Avg. mi./gal. | 4.91 | 5.16 | 6.97 |
| Avg. % Improvement | — | 5.1 | 42.0 |

The test speed of the vehicles, 56 m.p.h., is a speed at which approximately one half the horsepower output of the tractor's engine is used to overcome air resistance. Therefore, it is especially surprising that a deflector could be designed to produce the dramatic improvement evidenced by the subject invention. Reports from commercial truckers who have used the inventive air deflector also indicate dramatic improvement over prior art devices.

The invention disclosed will have many modifications which will be apparent to those skilled in the art in view of the teachings of the specification. It is intended that all modifications which fall within the true spirit and scope of this invention be included within the scope of the appended claims.

What is claimed is:

1. An air deflector suitable for mounting on the roof of a cab of a tractor of a tractor-trailer vehicle and providing a frontwardly facing air-deflecting surface for reducing air resistance to forward movement of the tractor-trailer vehicle, wherein the improvement comprises:

A. said air-deflecting surface is totally curved and forwardly convex in all its horizontal and vertical cross-sectional planes and is symmetrical about a vertical center plane and has a central portion and a pair of lateral wing portions symmetrically located on opposite sides of said central portion;

B. said deflector has a top edge of substantially circular curvature and a base edge of elliptical curvature substantially conforming to the equation $$y = \sqrt{1296\left(1 - \frac{x^2}{5184}\right)}$$

inches, wherein $x$ varies between about 34 and 69 inches;

C. the base edge curve in the middle region thereof over an arc distance of about 20° on either side of the midpoint of said base edge curve, corresponding to said central portion of said air-deflecting surface, and the top edge curve over substantially its entire extent, each has a radius of curvature of about 74 inches;

D. said base edge curve in each of the lateral end regions thereof on either side of said middle region, corresponding to said wing portions of said air-deflecting surface, has a radius of curvature of about 20 inches; and E. said air-deflecting surface is defined by (1) a generation of said middle region of said base edge curve upwardly through an angle of about 34° to said top edge curve, with the center of curvature of the so-generated central portion of said air-deflecting surface being located on a plane that is parallel to the plane of said base edge curve and below the same, the perpendicular distance between said planes being the product of (a) the 74 inch radius of curvature extending from said center of curvature to said base edge curve and (b) the sine of an angle of about 12 to 16° included between that radius and the lower one of said planes, and (2) a generation of said lateral end regions of said base edge curve through said angle of about 34° with gradually increasing radii of curvature until at said top edge the radii of curvature of said wing portions are merged into and become equal to the radius of curvature of said central portion.

2. An air deflector according to claim 1, wherein means are provided on the back surface thereof for reinforcing the strength of the deflector and for attachment of elements for securing the deflector to the cab roof.

3. An air deflector according to claim 1, wherein said radius of curvature of said top edge curve and of said middle region of said base edge curve is 73.75 inches, said radius of curvature of each of said lateral end regions of said base edge curve is 20.5 inches, said angle of generation of said air-deflecting surface is 34.2079 degrees, and said angle included between said lower plane and said radius of curvature extending from said center of curvature to said base edge curve is 13.726 degrees.

4. An air deflector according to claim 3, wherein means are provided on the back surface thereof for reinforcing the strength of the deflector and for attachment of elements for securing the deflector to the cab roof.

5. In combination, a tractor-trailer vehicle including a tractor having a cab with a roof and a trailer connected to the rear of the tractor and being towed thereby, the trailer having a front wall which extends up to a level above that of the roof of the tractor cab, a supporting structure secured to the top of the cab roof, and air deflector carried by said supporting structure and providing a frontwardly facing air-deflecting surface for reducing air resistance to forward movement of the tractor-trailer vehicle; wherein the improvement comprises:

A. said air-deflecting surface is totally curved and forwardly convex in all its horizontal and vertical cross-sectional planes and is symmetrical about a vertical center plane and has a central portion and a pair of lateral wing portions symmetrically located on opposite sides of said central portion;

B. said deflector has a top edge of substantially circular curvature and a base edge of elliptical curvature substantially conforming to the equation $$y = \sqrt{1296\left(1 - \frac{x^2}{5184}\right)}$$

inches, wherein x varies between about 34 and 69 inches;

C. the base edge curve in the middle region thereof over an arc distance of about 20° on either side of the midpoint of said base edge curve, corresponding to said central portion of sair air-deflecting surface, and the top edge curve over substantially its entire extent, each has a radius of curvature of about 74 inches;

D. said base edge curve in each of the lateral end regions thereof on either side of said middle region, corresponding to said wing portions of said air-deflecting surface, has a radius of curvature of about 20 inches; and E. said air-deflecting surface is defined by (1) a generation of said middle region of said base edge curve upwardly and rearwardly through an angle of about 34° to said top edge curve, with the center of curvature of the so-generated central portion of said air-deflecting surface being located on a plane that is parallel to the plane of said base edge curve and below the level of the cab roof, the perpendicular distance between said planes being the product of (a) the 74 inch radius of curvature extending from said center of curvature to said base edge curve and (b) the sine of an angle of about 12 to 16° included between that radius and the lower one of said planes, and (2) a generation of said lateral end regions of said base edge curve through said angle of about 34° with gradually increasing radii of curvature until at said top edge the radii of curvature of said wing portions are merged into and become equal to the radius of curvature of said central portion; and F. said supporting structure is arranged to orient said deflector so as to have a height, as measured vertically between two horizontal planes each tangent to a respective one of said top and base edges at the mid-point thereof, that is a function of the ratio of (1) the difference in height between the trailer front wall and the tractor cab roof to (2) the horizontal spacing between the rear of the cab and the front wall of the trailer;

G. whereby, when the tractor-trailer vehicle is in motion, said deflector is effective to reduce separation of air at the front of the trailer and to prevent stagnation of air at the front of said air-deflecting surface.

6. The combination according to claim 5, wherein said supporting structure includes means for adjusting said deflector relative to said cab roof and trailer front wall to adapt the height of said deflector to different ratios of cab/trailer height difference to cab/trailer spacing.

7. The combination according to claim 5, wherein said deflector is provided at the back surface thereof with means for reinforcing the strength of the deflector.

8. The combination according to claim 7, wherein said reinforcing means is a series of intersecting ribs, and said supporting structure is connected to said deflector at selected ones of said ribs.

9. An air deflector suitable for mounting on the roof of a cab of a tractor of a tractor-trailer vehicle and providing a frontwardly facing air-deflecting surface for reducing air resistance to forward movement of the tractor-trailer vehicle, wherein the improvement comprises:

A. said air-deflecting surface is (1) symmetrical about a vertical center plane and has a central portion and a pair of lateral wing portions symmetrically located on opposite sides of said central portion, (2) is totally curved and forwardly convex in all its horizontal and vertical cross-sectional planes, and (3) in said central portion has a uniform radius of curvature in all horizontal and vertical cross-sectional planes;

B. said deflector has a top edge and a base edge;

C. the center of curvature of said central portion of said air-deflecting surface is located on a plane that is parallel to the plane of said base edge of said deflector and below the same, the perpendicular distance between said planes being the product of (a) the radius of curvature extending from said center of curvature to said base edge and (b) the sine of an angle of about 12° to 16° included between that radius and the lower one of said planes; and D. the radii of curvature of said wing portions of said air-deflecting surface are smaller at said base edge than said radius of curvature of said central portion and gradually increase until at said top edge the radii of curvature of said wing portions are merged into and become equal to the radius of curvature of said central portion.

10. An air deflector assembly suitable for mounting on the roof of a cab of a tractor of a tractor-trailer vehicle and including an air deflector providing a frontwardly facing air-deflecting surface for reducing air resistance to forward movement of the tractor-trailer vehicle, and supporting structure means adapted to be connected to both said air deflector and the roof of the tractor cab for mounting said air deflector thereon; wherein the improvement comprises, A. said air-deflecting surface of said deflector is (1) symmetrical about a vertical center plane and has a central portion and a pair of lateral wing portions symmetrically located on opposite sides of said central portion, (2) is totally curved and forwardly convex in all its horizontal and vertical cross-sectional planes, and (3) in said central portion has a uniform radius of curvature in all horizontal and vertical cross-sectional planes;

B. said deflector has a top edge and a base edge;

C. the center of curvature of said central portion of said air-deflecting surface is located on a plane that is parallel to the plane of said base edge of said deflector and below the same, the perpendicular distance between said planes being the product of (a) the radius of curvature extending from said center of curvature to said base edge and (b) the sine of an angle of about 12 to 16 degrees included between that radius and the lower one of said planes; and D. the radii of curvature of said wing portions of said air-deflecting surface are smaller at said base edge than said radius of curvature of said central portion and gradually increase until at said top edge the radii of curvature of said wing portions are merged into and become equal to the radius of curvature of said central portion; and E. said supporting structure means includes first means adapted to be rigidly secured to said air deflector, second means adapted to be rigidly secured to said cab roof, and third means adapted to be interconnected between said first and second means to enable said deflector to be mounted so as to have a height, as measured vertically between two horizontal planes each tangent to a respective one of said top and base edges at the mid-point thereof, that is a function of the ratio of (1) the difference in height between the trailer front wall and the tractor cab roof to (2) the horizontal spacing between the rear of the cab and the front wall of the trailer.

11. An air deflector assembly according to claim 10, wherein said third means comprises strut means adapted to be adjustably interconnected between said first and second means to enable adjustment of said deflector relative to said cab roof and trailer front wall to adapt the height of said deflector to different ratios of cab/trailer height difference to cab/trailer spacing.

12. An air deflector assembly according to claim 11, wherein said deflector is provided at the back surface thereof with a series of intersecting ribs for reinforcing the strength of the deflector, and selected ones of said ribs are provided with means to enable said first means of said supporting structure means to be connected to said deflector at said selected ones of said ribs.

13. An air deflector assembly suitable for mounting on the roof of a cab of a tractor of a tractor-trailer vehicle and including an air deflector providing a frontwardly facing air-deflecting surface for reducing air resistance to forward movement of the tractor-trailer vehicle, and supporting structure means adapted to be connected to both said air deflector and the roof of the tractor cab for mounting said air deflector thereon; wherein the improvement comprises:

A. said air-deflecting surface of said deflector is totally curved and forwardly convex in all its horizontal and vertical cross-sectional planes and is symmetrical about a vertical center plane and has a central portion and a pair of lateral wing portions symmetrically located on opposite sides of said central portion;

B. said deflector has a top edge of substantially circular curvature and a base edge of elliptical curvature substantially conforming to the equation $$y = \sqrt{1296\left(1 - \frac{x^2}{5184}\right)}$$

inches, wherein $x$ varies between about 34 and 69 inches;

C. the base edge curve in the middle region thereof over an arc distance of about 20° on either side of the midpoint of said base edge curve, corresponding to said central portion of said air-deflecting surface, and the top edge curve over substantially its entire extent, each has a radius of curvature of about 74 inches;

D. said base edge curve in each of the lateral end regions thereof on either side of said middle region, corresponding to said wing portions of said air-deflecting surface, has a radius of curvature of about 20 inches; and E. said air-deflecting surface is defined by (1) a generation of said middle region of said base edge curve upwardly through an angle of about 34° to said top edge curve, with the center of curvature of the so-generated central portion of said air-deflecting surface being located on a plane that is parallel to the plane of said base edge curve and below the same, the perpendicular distance between said planes being the product of (a) the 74 inch radius of curvature extending from said center of curvature to said base edge curve and (b) the sine of an angle of about 12° to 16° included between that radius and the lower one of said planes, and (2) a generation of said lateral end regions of said base edge curve through said angle of about 34° with gradually increasing radii of curvature until at said top edge the radii of curvature of said wing portions are merged into and become equal to the radius of curvature of said central portion; and F. said supporting structure means includes first means adapted to be rigidly secured to said air deflector, second means adapted to be rigidly secured to said cab roof, and third means adapted to be interconnected between said first and second means to enable said deflector to be mounted so as to have a height, as measured vertically between two horizontal planes each tangent to a respective one of said top and base edges at the mid-point thereof, that is a function of the ratio of (1) the difference in height between the trailer front wall and the tractor cab roof to (2) the horizontal spacing between the rear of the cab and the front wall of the trailer.

14. An air deflector assembly according to claim 13, wherein said third means comprises strut means adapted to be adjustably interconnected between said first and second means to enable adjustment of said deflector relative to said cab roof and trailer front wall to adapt the height of said deflector to different ratios of cab/trailer height difference to cab/trailer spacing.

15. An air deflector assembly according to claim 14, wherein said deflector is provided at the back surface thereof with a series of intersecting ribs for reinforcing the strength of the deflector, and selected ones of said ribs are provided with means to enable said first means of said supporting structure means to be connected to said deflector at said selected ones of said ribs.

* * * * *